US012666211B2

(12) United States Patent
Banba et al.

(10) Patent No.: US 12,666,211 B2
(45) Date of Patent: Jun. 23, 2026

(54) AUDIO PROCESSING SYSTEM, AUDIO PROCESSING DEVICE, AND AUDIO PROCESSING METHOD

(71) Applicant: Panasonic Automotive Systems Co., Ltd., Kanagawa (JP)

(72) Inventors: Yutaka Banba, Kanagawa (JP); Tomofumi Yamanashi, Kanagawa (JP); Naoya Mochiki, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 202 days.

(21) Appl. No.: 18/593,369

(22) Filed: Mar. 1, 2024

(65) Prior Publication Data

US 2024/0205625 A1 Jun. 20, 2024

Related U.S. Application Data

(63) Continuation of application No. PCT/JP2022/019866, filed on May 10, 2022.

(30) Foreign Application Priority Data

Sep. 9, 2021 (JP) ................................ 2021-147174

(51) Int. Cl.

| | |
|---|---|
| ***H04R 29/00*** | (2006.01) |
| ***H04R 1/40*** | (2006.01) |
| ***H04R 3/00*** | (2006.01) |

(52) U.S. Cl.
CPC ........... *H04R 29/005* (2013.01); *H04R 1/406* (2013.01); *H04R 3/005* (2013.01); *H04R 2499/13* (2013.01)

(58) Field of Classification Search
CPC ...... H04R 29/005; H04R 1/406; H04R 3/005; H04R 2499/13

(Continued)

(56) References Cited

U.S. PATENT DOCUMENTS

| | | | |
|---|---|---|---|
| 2009/0268899 A1 | 10/2009 | Tokuda et al. | |
| 2009/0296946 A1 | 12/2009 | Zhang | |

(Continued)

FOREIGN PATENT DOCUMENTS

| | | | |
|---|---|---|---|
| JP | 2002159086 A | | 5/2002 |
| JP | 2009152949 | * | 1/2009 |

(Continued)

OTHER PUBLICATIONS

English Translation of International Search Report, mailed Aug. 9, 2022, for PCT Patent Application No. PCT/JP2022/019866. (2 pages).

(Continued)

*Primary Examiner* — William A Jerez Lora
(74) *Attorney, Agent, or Firm* — Seed Intellectual Property Law Group LLP

(57) ABSTRACT

An audio processing system includes a first microphone, a second microphone, and a processor. The first microphone collects first audio and outputs a first audio signal. The second microphone collects second audio and outputs a second audio signal. The processor detects presence or absence of failure of the first microphone and the second microphone, and transmits a detection result as failure detection information. The processor generates a first output signal on the basis of one of the first audio signal and the second audio signal. The processor generates the first output signal in a first mode when the failure detection information represents that the second microphone fails. The first mode is a mode in which the processor generates the first output signal on the basis of the first audio signal output by the first microphone for which no failure is detected.

5 Claims, 11 Drawing Sheets

(58) Field of Classification Search
USPC ............................................ 381/56, 58, 122
See application file for complete search history.

(56) References Cited

U.S. PATENT DOCUMENTS

| | | | | |
|---|---|---|---|---|
| 2015/0124997 | A1* | 5/2015 | Banba .................... | H04R 1/326 381/92 |
| 2016/0037277 | A1 | 2/2016 | Matsumoto et al. | |
| 2022/0301576 | A1* | 9/2022 | Otsuka ................... | H04R 1/406 |

FOREIGN PATENT DOCUMENTS

| | | | |
|---|---|---|---|
| JP | 2009152949 | A | 7/2009 |
| JP | 2009278620 | A | 11/2009 |
| JP | 2016032260 | A | 3/2016 |

OTHER PUBLICATIONS

Notice of Reasons for Refusal, dated Feb. 4, 2025, for Japanese Patent Application No. 2021-147174. (7 pages) (with English Translation).

* cited by examiner

| SW NAME \ PROCESSING STEP | S4 | S5 | S7 | S8 |
|---|---|---|---|---|
| SW1 | 2301 OR 2302 | 2301 OR 2302 | 2302 | 2301 |
| SW2 | 2303 OR 2304 | 2304 | 2303 OR 2304 | 2303 |
| SW3 | ON | ON | OFF | OFF |
| SW4 | ON | OFF | ON | OFF |

AUDIO PROCESSING SYSTEM, AUDIO PROCESSING DEVICE, AND AUDIO PROCESSING METHOD

CROSS-REFERENCE TO RELATED APPLICATIONS

This application is a continuation of International Application No. PCT/JP2022/019866, filed on May 10, 2022, which claims the benefit of priority of the prior Japanese Patent Application No. 2021-147174, filed on Sep. 9, 2021, the entire contents of which are incorporated herein by reference.

FIELD

The present disclosure relates generally to an audio processing system, an audio processing device, and an audio processing method.

BACKGROUND

An audio processing system has been known, in which audio in a specific direction is collected with emphasis by using one or more pairs of two microphones. Regarding such an audio processing system, for example, Japanese Patent Application Laid-open No. 2009-152949 discloses a configuration in which, when a microphone collecting audio fails, directivity synthesis can be performed so as to have a form as close as possible to that before the failure using the remaining microphones that do not fail. In addition, Japanese Patent Application Laid-open No. 2009-278620 discloses a configuration in which an output of a microphone array can be blocked when failure of a microphone is detected.

SUMMARY

An audio processing system according to one aspect of the present disclosure includes a first microphone, a second microphone, a memory, and a hardware processor connected to the memory. The first microphone is configured to collect first audio and output a first audio signal corresponding to the first audio. The second microphone is configured to collect second audio and output a second audio signal corresponding to the second audio. The memory stores a computer program. The hardware processor is configured to perform processing by executing the computer program. The processing includes detecting presence or absence of failure of at least one of the first microphone and the second microphone and transmitting a detection result as failure detection information. The processing includes generating a first output signal on the basis of at least one of the first audio signal and the second audio signal. The processing includes generating the first output signal in a first mode when the failure detection information includes information representing that the second microphone fails. The first mode is a mode in which the hardware processor generates the first output signal on the basis of the first audio signal output by the first microphone for which no failure is detected.

DETAILED DESCRIPTION

Hereinafter, embodiments of the present disclosure will be described in detail with reference to the drawings as appropriate. However, unnecessarily detailed description may be omitted. Note that the accompanying drawings and the following description are provided for those skilled in the art to fully understand the present disclosure, and are not intended to limit the subject matter described in the claims.

Schematic Configuration of Embodiment

Figure 1:
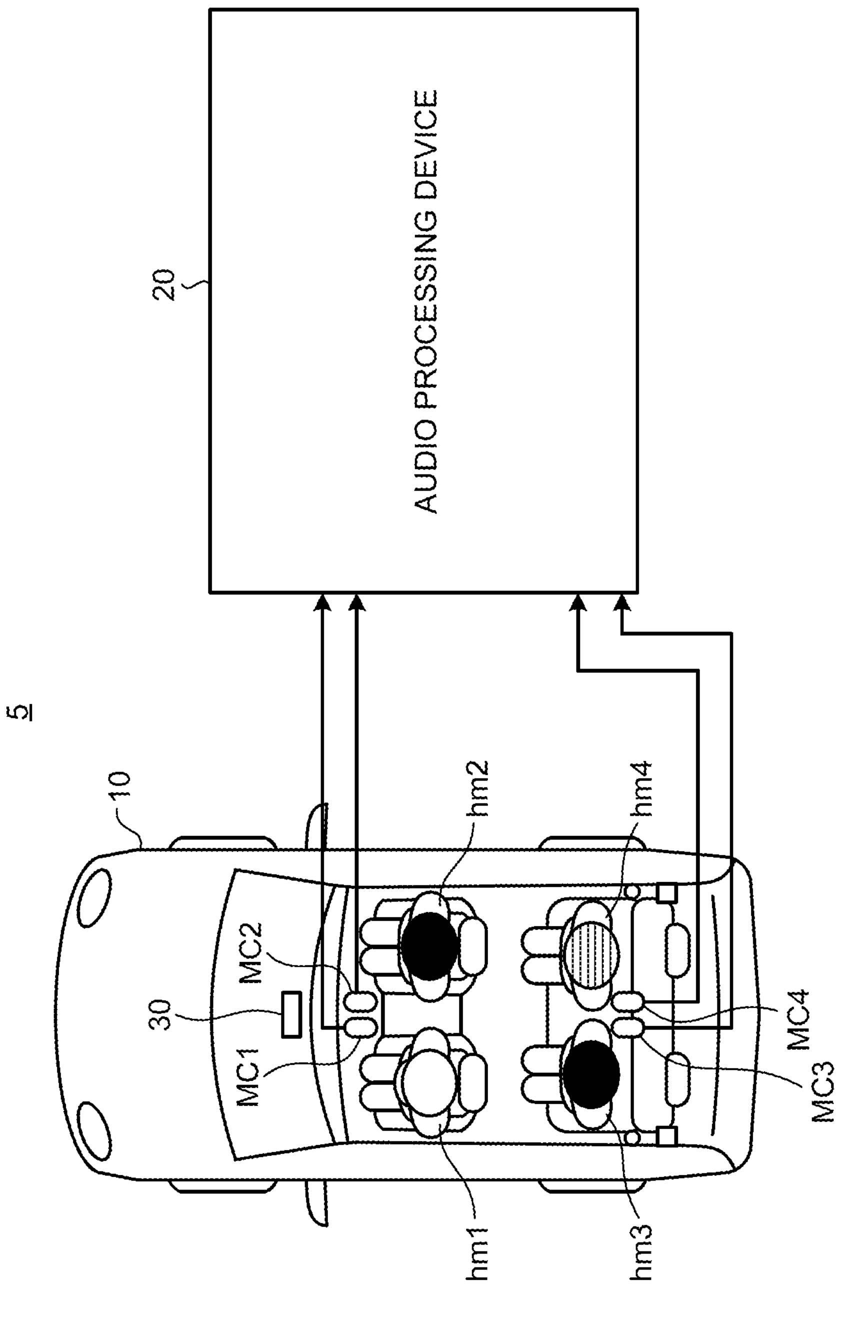
FIG. 1 is a diagram illustrating an example of a schematic configuration of an audio processing system according to an embodiment.

FIG. 1 is a diagram illustrating an example of a schematic configuration of an audio processing system 5 according to the present embodiment. The audio processing system 5 is mounted on a vehicle 10, for example. Hereinafter, an example that the audio processing system 5 is mounted on the vehicle 10 will be described.

Multiple seats are provided in a vehicle interior of the vehicle 10. The seats are, for example, four seats including a driver seat, a passenger seat, and left and right rear seats. Note that the number of seats is not limited to this. Hereinafter, a person seated on the passenger seat is referred to as an occupant hm1, a person seated on the driver seat is referred to as an occupant hm2, a person seated on the left side of the rear seats is referred to as an occupant hm3, and a person seated on the right side of the rear seats is referred to as an occupant hm4. Note that, in the present embodiment, it is assumed that the vehicle 10 is a right-hand drive car, and the occupant hm2 is a driver of the vehicle 10.

The audio processing system 5 includes a microphone MC1, a microphone MC2, a microphone MC3, a microphone MC4, and an audio processing device 20. The audio processing system 5 illustrated in FIG. 1 is provided with microphones whose number is equal to the number of seats, that is, four microphones, whereas the number of microphones may not be equal to the number of seats. The microphone MC1, the microphone MC2, the microphone MC3, and the microphone MC4 output audio signals to the audio processing device 20.

Both the microphone MC1 and the microphone MC2 are omnidirectional microphones. The microphone MC1 and the microphone MC2 are arranged in a state of being close to each other. The microphone MC1 and the microphone MC2 are arranged, for example, at center positions between the driver seat and the passenger seat in an overhead console. The microphone MC1 is arranged on the side of the occupant hm1, and the microphone MC2 is arranged on the side of the occupant hm2.

Both the microphone MC3 and the microphone MC4 are omnidirectional microphones. The microphone MC3 and the microphone MC4 are arranged in a state of being close to each other. The microphone MC3 and the microphone MC4 are arranged, for example, at center positions between the left rear seat and the right rear seat on a ceiling. The microphone MC3 is arranged on the side of the occupant hm3, and the microphone MC4 is arranged on the side of the occupant hm4.

The arrangement positions of the microphone MC1, the microphone MC2, the microphone MC3, and the microphone MC4 illustrated in FIG. 1 are each an example, and may be arranged at other positions. Hereinafter, the microphone MC1 may be referred to as a first microphone, the microphone MC2 may be referred to as a second microphone, the microphone MC3 may be referred to as a third microphone, and the microphone MC4 may be referred to as a fourth microphone.

Each of the microphones may be a small micro electro mechanical systems (MEMS) microphone or may be an electret condenser microphone (ECM).

The audio processing system 5 illustrated in FIG. 1 includes the audio processing device 20. In FIG. 1, four persons get on the vehicle 10, but the number of persons who get on the vehicle is not limited thereto. The number of persons who get on the vehicle may be equal to or less than a maximum riding capacity of the vehicle 10. For example, when the maximum riding capacity of the vehicle 10 is six, the number of persons who get on the vehicle may be six or may be five or less.

Hardware Configuration of Embodiment

Figure 2:
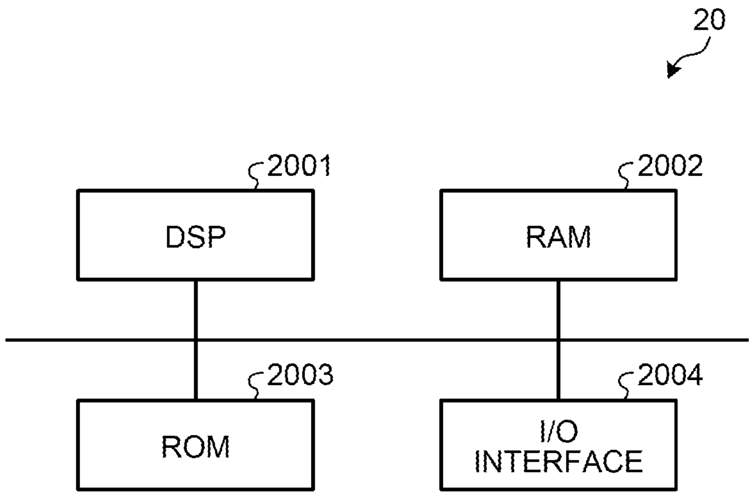
FIG. 2 is a diagram illustrating an example of a hardware configuration of an audio processing device according to the embodiment.

FIG. 2 is a diagram illustrating an example of a hardware configuration of the audio processing device 20 according to the present embodiment. In the example illustrated in FIG. 2, the audio processing device 20 includes a digital signal processor (DSP) 2001, a random access memory (RAM) 2002, a read only memory (ROM) 2003, and an input/output (I/O) interface 2004.

The DSP 2001 is a processor capable of executing a computer program. Note that the type of the processor included in the audio processing device 20 is not limited to the DSP 2001. For example, the audio processing device 20 may be a central processing unit (CPU) or other hardware. The audio processing device 20 may include a plurality of processors.

The RAM 2002 is a volatile memory used as a cache, a buffer, or the like. Note that the type of the volatile memory included in the audio processing device 20 is not limited to the RAM 2002. The audio processing device 20 may include a register instead of the RAM 2002. The audio processing device 20 may include a plurality of volatile memories.

The ROM 2003 is a nonvolatile memory that stores various types of information including a computer program. The DSP 2001 reads a specific computer program from the ROM 2003 and executes the program to implement a function of the audio processing device 20. The function of the audio processing device 20 will be described later. Note that the type of the nonvolatile memory included in the audio processing device 20 is not limited to the ROM 2003. For example, the audio processing device 20 may include a flash memory instead of the ROM 2003. The audio processing device 20 may include a plurality of nonvolatile memories.

The I/O interface 2004 is an interface device to which an external device is connected. Here, the external device is, for example, a device such as the microphone MC1, the microphone MC2, the microphone MC3, or the microphone MC4. The audio processing device 20 may include a plurality of I/O interfaces 2004.

As described above, the audio processing device 20 includes the memory in which the computer program is stored and the processor capable of executing the computer program. Thus, the audio processing device 20 can be regarded as a computer. Note that the number of computers required to implement the function as the audio processing device 20 is not limited to one. The function as the audio processing device 20 may be implemented by cooperation of two or more computers.

Functional Configuration of Embodiment

Figure 3:
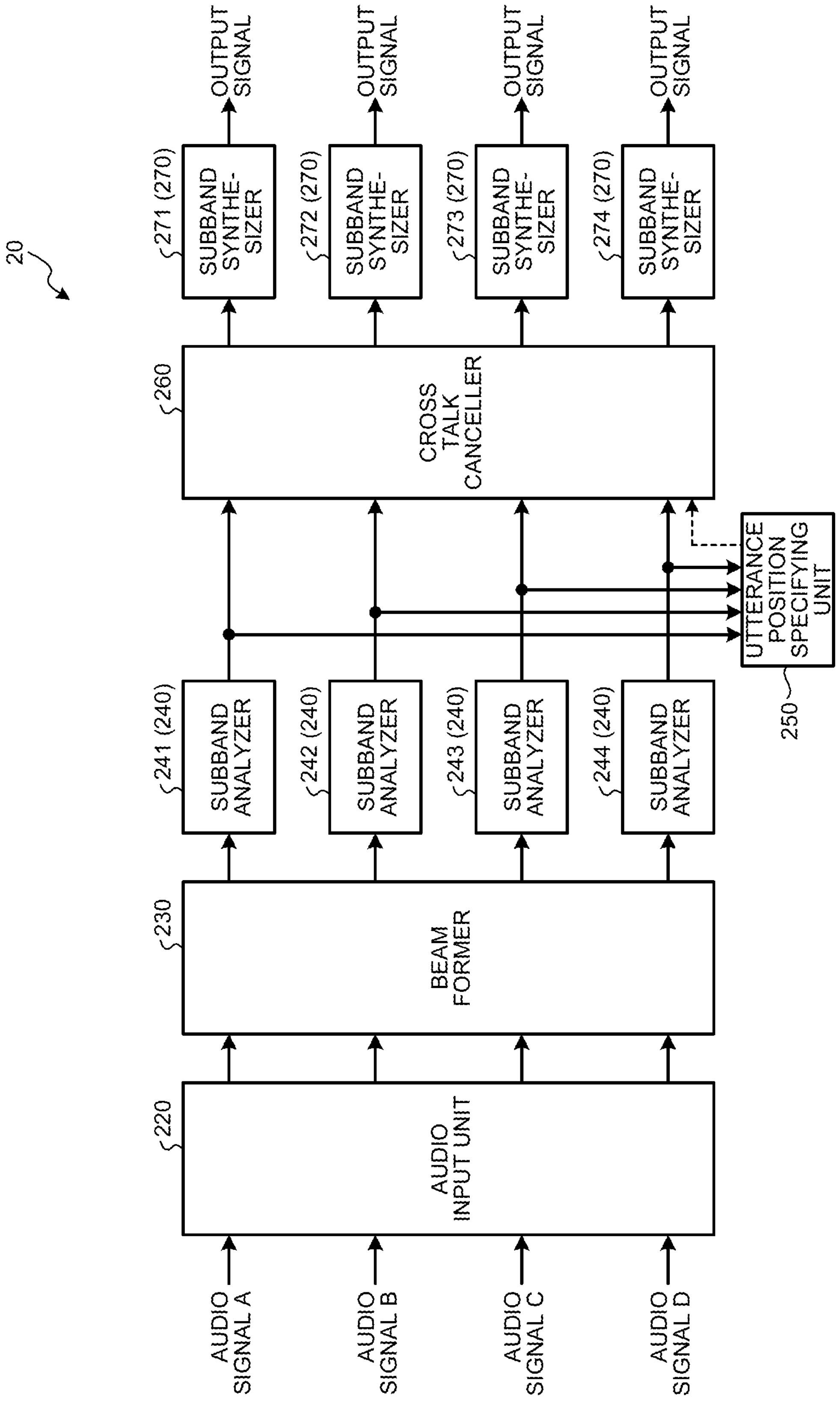
FIG. 3 is a block diagram illustrating an example of functions included in the audio processing device according to the embodiment.

FIG. 3 is a block diagram illustrating an example of functions included in the audio processing device 20 according to the present embodiment. The audio processing device 20 includes an audio input unit 220, a beam former 230, a subband analyzer 240, an utterance position specifying unit 250, a cross talk canceller 260, and a subband synthesizer 270. Audio signals are input from the microphone MC1, the microphone MC2, the microphone MC3, and the microphone MC4 to the audio processing device 20. Then, the audio processing device 20 processes the input audio signal and outputs an audio processing result.

The microphone MC1 collects a first audio and outputs a first audio signal corresponding to the first audio. Specifically, the microphone MC1 generates an audio signal A by converting the collected audio into an electric signal. Then, the microphone MC1 outputs the audio signal A to the audio input unit 220. The audio signal A is a signal including voice of the occupant hm1 and noises such as voice of persons other than the occupant hm1, music sound emitted from an audio device, and/or traveling noise.

The microphone MC2 collects a second audio and outputs a second audio signal corresponding to the second audio. Specifically, the microphone MC2 generates an audio signal B by converting the collected audio into an electric signal. Then, the microphone MC2 outputs the audio signal B to the audio input unit 220. The audio signal B is a signal including voice of the occupant hm2 and noises such as voice of persons other than the occupant hm2, music sound emitted from an audio device, and/or traveling noise.

The microphone MC3 collects a third audio and outputs a third audio signal corresponding to the third audio. Specifically, the microphone MC3 generates an audio signal C by converting the collected audio into an electric signal. Then, the microphone MC3 outputs the audio signal C to the audio input unit 220. The audio signal C is a signal including voice of the occupant hm3 and noises such as voice of persons other than the occupant hm3, music sound emitted from an audio device, and/or traveling noise.

The microphone MC4 collects a fourth audio and outputs a fourth audio signal corresponding to the fourth audio. Specifically, the microphone MC4 generates an audio signal D by converting the collected audio into an electric signal. Then, the microphone MC4 outputs the audio signal D to the audio input unit 220. The audio signal D is a signal including voice of the occupant hm4 and noises such as voice of persons other than the occupant hm4, music sound emitted from an audio device, and/or traveling noise.

The audio input unit 220 receives the audio signal from each of the microphone MC1, the microphone MC2, the microphone MC3, and the microphone MC4. In a case where an input audio signal is an analog signal, the audio input unit 220 performs analog-to-digital conversion on the input audio signal, and then outputs a digital signal to the beam former. The audio input unit 220 is an example of an input unit. Note that the audio input unit 220 is not essential to the audio processing device 20.

The beam former 230 emphasizes audio in a direction of a target seat by directivity control. Here, a case where the audio in the direction of the passenger seat is emphasized in the first audio signal output from the microphone MC1 will be described as an example. The microphone MC1 and the microphone MC2 are arranged in the vicinity to each other. Therefore, it is assumed that the first audio signal output from the microphone MC1 includes voice of the occupant hm2 on the driver seat as well as voice of the occupant hm1 on the passenger seat. Similarly, it is assumed that the second audio signal output from the microphone MC2 includes voice of the occupant hm1 on the passenger seat as well as voice the occupant hm2 on the driver seat.

The microphone MC1 is slightly farther from the driver seat than the microphone MC2. Therefore, when the occupant hm1 on the passenger seat utters, voice of this occupant hm1 included in the second audio signal output from the microphone MC2 is slightly delayed from voice of the occupant hm1 included in the first audio signal output from the microphone MC1.

Therefore, the beam former 230 applies a delay amount indicating a time delay to the audio signal to form a blind spot where sensitivity becomes low with respect to a direction other than the direction of the target seat, thereby relatively emphasizing the audio in the direction of the target seat. Then, the beam former 230 outputs, to the utterance position specifying unit 250, an audio signal in which audio in the direction of the target seat has been emphasized. Note that the method by which the beam former 230 emphasizes the audio in the direction of the target seat is not limited to the above.

The subband analyzer 240 divides an output signal output by the beam former 230 into signals of plural frequency bands. Specifically, a subband analyzer 241 divides an output signal corresponding to the audio signal A output by the beam former 230 for each predetermined band. A subband analyzer 242 divides an output signal corresponding to the audio signal B output by the beam former 230 for each predetermined band. A subband analyzer 243 divides an output signal corresponding to the audio signal C output by the beam former 230 for each predetermined band. A subband analyzer 244 divides an output signal corresponding to the audio signal D output by the beam former 230 for each predetermined band.

The utterance position specifying unit 250 specifies an utterance position on the basis of the output signal output by the subband analyzer 240. Specifically, the utterance position specifying unit 250 detects an output signal having the highest intensity for each band divided by the subband analyzer 240, and specifies the utterance position on the basis of the output signal.

In addition, the utterance position specifying unit 250 outputs a signal to the cross talk canceller 260 in accordance with a specifying result of the utterance position. For example, in a case where the cross talk canceller 260 is provided with an adaptive filter, the utterance position specifying unit 250 outputs an instruction to update a coefficient of the adaptive filter that suppresses other audio, in accordance with the specifying result of the utterance position. Thereby, the utterance position specifying unit 250 controls learning of the adaptive filter.

The cross talk canceller 260 cancels audio emitted from directions other than a direction in which the target seat is located. That is, the cross talk canceller 260 executes cross-talk cancellation processing. The audio signals from all the microphones are subjected to directivity control processing by the beam former 230, and an output signal subjected to band division by the subband analyzer 240 is input to the cross talk canceller 260.

The cross talk canceller 260 cancels an audio component collected from a direction other than a direction in which the target seat is located, by using, as a reference signal, an audio signal from a microphone other than the microphone in the target seat among the input audio signals. In other words, the cross talk canceller 260 cancels an audio component specified by the reference signal from the audio signal related to the microphone in the target seat. Then, the cross talk canceller 260 outputs the audio signal after the crosstalk cancellation processing.

The subband synthesizer 270 synthesizes audio signals that are obtained by the crosstalk cancellation processing by the cross talk canceller 260 and outputs an output signal.

Specifically, a subband synthesizer 271 synthesizes audio signals of the bands, in which crosstalk components have been suppressed by the cross talk canceller 260, thereby synthesizing the audio signals A after the crosstalk component suppression. The subband synthesizer 271 outputs a synthesized audio signal A. A subband synthesizer 272 synthesizes audio signals of the bands, in which crosstalk components have been suppressed by the cross talk canceller 260, thereby synthesizing the audio signals B after the crosstalk component suppression. The subband synthesizer 272 outputs a synthesized audio signal B.

A subband synthesizer 273 synthesizes audio signals of the bands, in which crosstalk components have been suppressed by the cross talk canceller 260, thereby synthesizing the audio signals C after the crosstalk component suppression. The subband synthesizer 273 outputs a synthesized audio signal C. A subband synthesizer 274 synthesizes audio signals of the band, in which crosstalk components have been suppressed by the cross talk canceller 260, thereby synthesizing the audio signals D after the crosstalk component suppression. The subband synthesizer 271 outputs the synthesized audio signal D.

Figure 4:
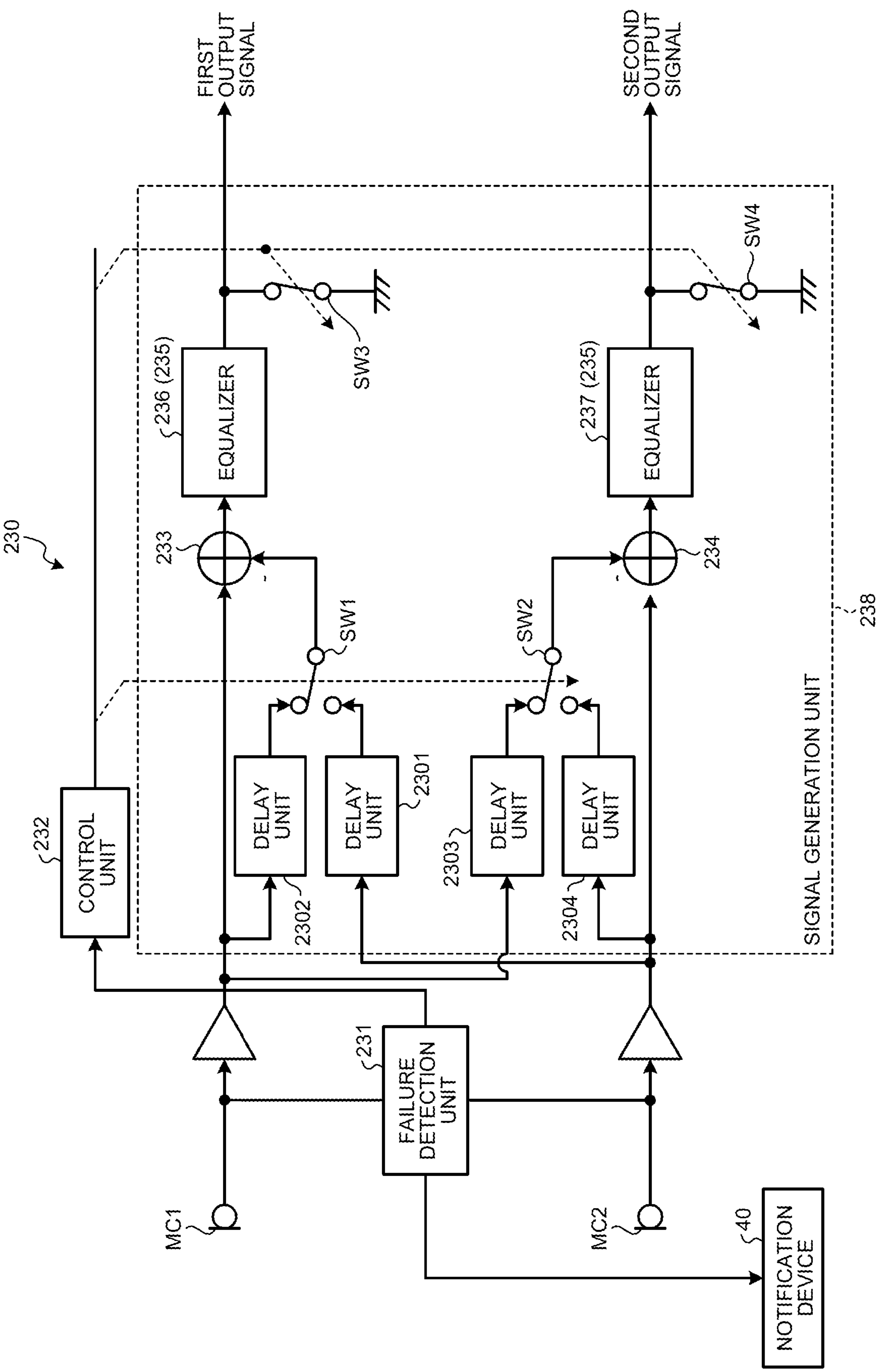
FIG. 4 is a diagram illustrating an example of a configuration of a beam former of the audio processing device according to the embodiment.

FIG. 4 is a diagram illustrating an example of a configuration of the beam former 230 according to the present embodiment. The beam former 230 includes a failure detection unit 231, a control unit 232, an adder 233, an adder 234, an equalizer 236, an equalizer 237, a delay unit 2301, a delay unit 2302, a delay unit 2303, a delay unit 2304, a switch SW1, a switch SW2, a switch SW3, and a switch SW4.

A configuration including the adder 233, the adder 234, the equalizer 236, the equalizer 237, the delay unit 2301, the delay unit 2302, the delay unit 2303, the delay unit 2304, the switch SW1, the switch SW2, the switch SW3, and the switch SW4 may be referred to as a signal generation unit 238. Note that, in the example illustrated in FIG. 4, the microphone MC1 and the microphone MC2 are provided in the overhead console of the vehicle 10. The form of the microphones illustrated in FIG. 4 is not limited to this, and can also be applied to the center of the ceiling near the rear seats of the vehicle 10.

The failure detection unit 231 detects the presence or absence of failure of at least one of the first microphone and the second microphone, and transmits a detection result to the control unit 232 as failure detection information. When the failure detection information includes information representing that at least one of the first microphone and the second microphone fails, the failure detection unit 231 outputs the failure detection information to a notification device 40. For example, when specific frequency band levels of the signals of the microphone MC1 and the microphone MC2 fall outside a preset threshold value, the failure detection unit 231 detects that at least one of the microphones fails.

The control unit 232 controls the switch SW1, the switch SW2, the switch SW3, and the switch SW4 on the basis of the failure detection information transmitted by the failure detection unit 231. Specifically, when the failure detection information includes information representing that the second microphone fails, the control unit 232 controls the switch SW1, the switch SW2, the switch SW3, and the switch SW4 to operate in a first mode in which the first output signal is generated on the basis of the first audio signal output by the first microphone for which no failure is detected.

Moreover, when the failure detection information includes information representing that neither the first microphone nor the second microphone fails, the control unit 232 controls the switch SW1, the switch SW2, the switch SW3, and the switch SW4 to operate in a second mode in which the first output signal is generated on the basis of the first audio signal and the second audio signal. The first mode and the second mode will be described later in detail.

In addition, when the failure detection information includes information representing that the second microphone fails, the control unit 232 may control the switch SW1, the switch SW2, the switch SW3, and the switch SW4 not to output the second output signal.

When the second microphone fails, the control unit 232 controls the switch SW1 such that the delay unit 2302 adds the delay amount to the first audio signal. When neither the first microphone nor the second microphone fails, that is, in the second mode, the control unit 232 controls the switch SW1 such that the delay unit 2301 adds the delay amount to the second audio signal.

Moreover, when the first microphone fails, the control unit 232 may control the switch SW1 to select either the delay unit 2301 adding the delay amount to the second audio signal or the delay unit 2302 adding the delay amount to the first audio signal. When both the first microphone and the second microphone fail, the control unit 232 may control the switch SW1 to select either the delay unit 2301 adding the delay amount to the second audio signal or the delay unit 2302 adding the delay amount to the first audio signal.

When the first microphone fails, the control unit 232 controls the switch SW2 such that the delay unit 2304 adds the delay amount to the second audio signal. When neither the first microphone nor the second microphone fails, that is, in the second mode, the control unit 232 controls the switch SW2 such that the delay unit 2303 adds the delay amount to the first audio signal.

When the second microphone fails, the control unit 232 may control the switch SW2 such that either the delay unit 2303 adding the delay amount to the first audio signal or the delay unit 2304 adding the delay amount to the second audio signal is selected. When both the first microphone and the second microphone fail, the control unit 232 may control the switch SW2 such that either the delay unit 2303 adding the delay amount to the first audio signal or the delay unit 2304 adding the delay amount to the second audio signal is selected.

The control unit 232 may switch the switch SW3 to ON when only the first microphone fails. In addition, the control unit 232 may switch the switch SW3 to ON when both the first microphone and the second microphone fail. A state where the switch SW3 is turned on is a state where the first output signal is not output, that is, a state of MUTE. The control unit 232 switches the switch SW3 to OFF when neither the first microphone nor the second microphone fails. The control unit 232 switches the switch SW3 to OFF when only the second microphone fails. A state where the switch SW3 is turned off is a state where the first output signal is output. The first output signal will be described in detail later.

The control unit 232 may switch the switch SW4 to ON when only the second microphone fails. In addition, the control unit 232 may switch the switch SW4 to ON when both the first microphone and the second microphone fail. A state where the switch SW4 is turned on is a state where the second output signal is not output, that is, a state of MUTE. The control unit 232 switches the switch SW4 to OFF when neither the first microphone nor the second microphone fails. The control unit 232 may switch the switch SW4 to OFF when only the first microphone fails. A state where the switch SW4 is turned off is a state where the second output signal is output. The second output signal will be described in detail later. The delay unit 2301 and the delay unit 2302 will be described in detail later.

The adder 233 subtracts the output from the switch SW1 from the audio signal of the first microphone, and outputs a subtraction result to the equalizer 236 as a first sound pressure gradient processing output. In addition, the adder 234 subtracts the output from the switch SW2 from the audio signal of the second microphone, and outputs a subtraction result to the equalizer 237 as a second sound pressure gradient processing output.

The equalizer 236 corrects a frequency characteristic of output of the first sound pressure gradient processing that is output from the adder 234, and outputs the corrected signal as the first output signal that is a signal corresponding to the first microphone. The equalizer 237 corrects a frequency characteristic of output of the second sound pressure gradient processing that is output from the adder 234, and outputs the corrected signal as the second output signal that is a signal corresponding to the second microphone. Hereinafter, the equalizer 236 and the equalizer 237 may be collectively referred to as an equalizer 235.

The signal generation unit 238 generates the first output signal on the basis of at least one of the first audio signal and the second audio signal. More specifically, the signal generation unit 238 generates the first output signal by subtracting, from the first audio signal, a subtraction signal that is a signal based on at least one of the first audio signal and the second audio signal.

The signal generation unit 238 generates the subtraction signal by delaying the first audio signal by a second delay amount in the first mode. The signal generation unit 238 generates the subtraction signal by delaying the second audio signal by a first delay amount in the second mode. The signal generation unit 238 generates the second output signal on the basis of at least one of the first audio signal and the second audio signal, outputs the first output signal as the signal corresponding to the first microphone, and outputs the second output signal as the signal corresponding to the second microphone.

In the present embodiment, the failure detection unit 231, the control unit 232, the adder 233, the adder 234, the equalizer 235, the signal generation unit 238, the delay unit 2301, the delay unit 2302, the delay unit 2303, the delay unit 2304, the switch SW1, the switch SW2, the switch SW3, and the switch SW4 included in the audio processing device 20 are implemented by hardware. Alternatively, the functions of the failure detection unit 231, the control unit 232, the adder 233, the adder 234, the equalizer 235, the signal generation unit 238, the delay unit 2301, the delay unit 2302, the switch SW1, the switch SW2, the switch SW3, and the switch SW4 may be implemented by the processor executing the program stored in the memory.

When the failure detection information includes information representing that at least one of the first microphone and the second microphone fails, the notification device 40 notifies that at least one of the first microphone and the second microphone fails. The notification device 40 may be, for example, an electronic device in the vehicle 10, a speaker in the vehicle 10, or a room lamp or a map lamp on the ceiling in the vehicle 10.

Next, content in which the control unit 232 controls the switch SW1, the switch SW2, the switch SW3, and the switch SW4 on the basis of the failure detection information will be described. In the first mode, either the microphone MC1 or the microphone MC2 fails. In the second mode, neither the microphone MC1 nor the microphone MC2 fails.

First, a case where the microphone MC2 fails in the first mode will be described. At this time, the first output signal is generated on the basis of the first audio signal output by the microphone MC1. More specifically, first, the adder 233 subtracts a signal having been obtained by adding a delay amount to the first audio signal by the delay unit 2302, from the first audio signal output by the microphone MC1. The equalizer 236 performs correction of a frequency characteristic on a subtraction result to generate the first output signal. At this time, the input of the switch SW2 may be a signal having been obtained by adding a delay amount to the first audio signal by the delay unit 2301, or may be a signal having been obtained by adding a delay amount to the second audio signal by the delay unit 2302. At this time, the switch SW4 may be turned on so that the second output signal can be muted.

Moreover, a case where the microphone MC1 fails in the first mode will be described. At this time, the second output signal is generated on the basis of the second audio signal output by the microphone MC2. More specifically, first, the adder 234 subtracts a signal having been obtained by adding a delay amount to the second audio signal by the delay unit 2302, from the second audio signal output by the microphone MC2. The equalizer 237 performs correction of a frequency characteristic on a subtraction result to generate the second output signal. At this time, the input of the switch SW1 may be a signal having been obtained by adding a delay amount to the second audio signal by the delay unit 2301, or may be a signal having been obtained by adding a delay amount to the first audio signal by the delay unit 2302. At this time, the switch SW3 may be turned on so that the first output signal can be muted.

Next, the second mode will be described. The second mode is an operation that is performed in a case where the microphone MC1 and the microphone MC2 do not fail. In the second mode, the first output signal is generated on the basis of the first audio signal output by the microphone MC1 and the second audio signal output by the microphone MC2. More specifically, first, the adder 233 subtracts a signal having been obtained by adding a delay amount to the second audio signal output by the microphone MC2 by the delay unit 2301, from the first audio signal output by the microphone MC1. The equalizer 236 performs correction of a frequency characteristic on a subtraction result to generate the first output signal.

In the second mode, the second output signal is generated on the basis of the first audio signal output by the microphone MC1 and the second audio signal output by the microphone MC2. More specifically, first, the adder 234 subtracts a signal having been obtained by adding a delay amount to the first audio signal output by the microphone MC1 by the delay unit 2301, from the second audio signal output by the microphone MC2. The equalizer 237 performs correction of a frequency characteristic on a subtraction result to generate the second output signal.

Figure 5:
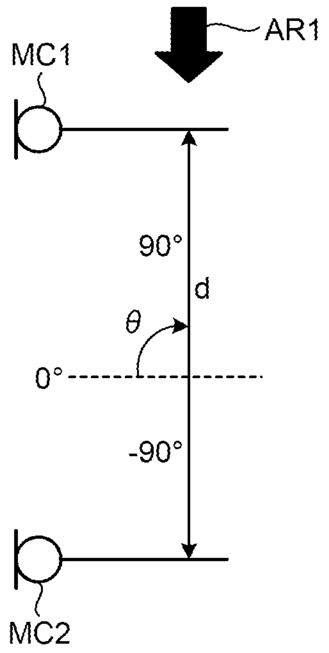
FIG. 5 is a diagram illustrating a delay amount according to the embodiment.

Here, content in which different delay amounts are added to the audio signals output by the microphones in accordance with the failure states of the microphone MC1 and the microphone MC2 will be described with reference to FIG. 5. FIG. 5 is a diagram illustrating a delay amount according to the present embodiment. The delay amount of the present embodiment is a delay amount added by the delay unit 2301 and a delay amount added by the delay unit 2302. The delay amount added by the delay unit 2301 may be referred to as a first delay amount, and the delay amount added by the delay unit 2302 may be referred to as a second delay amount. The second delay amount is larger than the first delay amount. For example, the second delay amount is twice the first delay amount.

In FIG. 5, the microphone MC1 and the microphone MC2 are arranged at a distance d. Moreover, in FIG. 5, a sound wave comes in a direction of an arrow AR1. The direction of the arrow corresponds to a target direction sound source arrival direction. When a midpoint of a line segment connecting the microphone MC1 and the microphone MC2 is set to an origin, a direction from the origin toward the left side of a plane of paper is set to 0°, a direction from the origin toward the microphone MC1 is set to 90°, and a direction from the origin toward the microphone MC2 is set to −90°, the target direction sound source arrival angle is 90°. At this time, a delay amount is set such that $\tau=d/C$ (sec) is satisfied when a sound velocity is set to C.

At this time, the audio collected by the microphone MC2 arrives after being delayed by the delay amount $\tau$ (sec) with respect to the audio collected by the microphone MC1. That is, when the sound source arrival direction is fixed in the direction of the arrow AR1, the second audio signal output by the microphone MC2 can be replaced with a signal having been obtained by adding the delay amount $\tau$ to the first audio signal output by the microphone MC1. The delay amount $\tau$ at this time corresponds to the first delay amount.

Moreover, when the sound source arrival direction is fixed in the direction of the arrow AR1, a signal having been obtained by adding the first delay amount to the second audio signal output by the microphone MC2 can be replaced with a signal having been obtained by adding a delay amount, which is twice the first delay amount, to the first audio signal output by the microphone MC1. Note that the delay amount that is twice the first delay amount is, in other words, the second delay amount.

For example, when the microphone MC2 fails, the adder 233 subtracts, from the first audio signal output by the microphone MC1, a subtraction signal having been obtained by adding the second delay amount to the first audio signal output by the microphone MC1, and the equalizer 236 performs correction of a frequency characteristic on a subtraction result, thereby generating the first output signal. As a result, in a case where the sound source arrival direction is constant, even when the microphone MC2 fails, by using the subtraction signal having been obtained by adding the second delay amount to the first audio signal output by the microphone MC1, processing equivalent to that in a state where the microphone MC2 does not fail can be performed.

Figure 6:
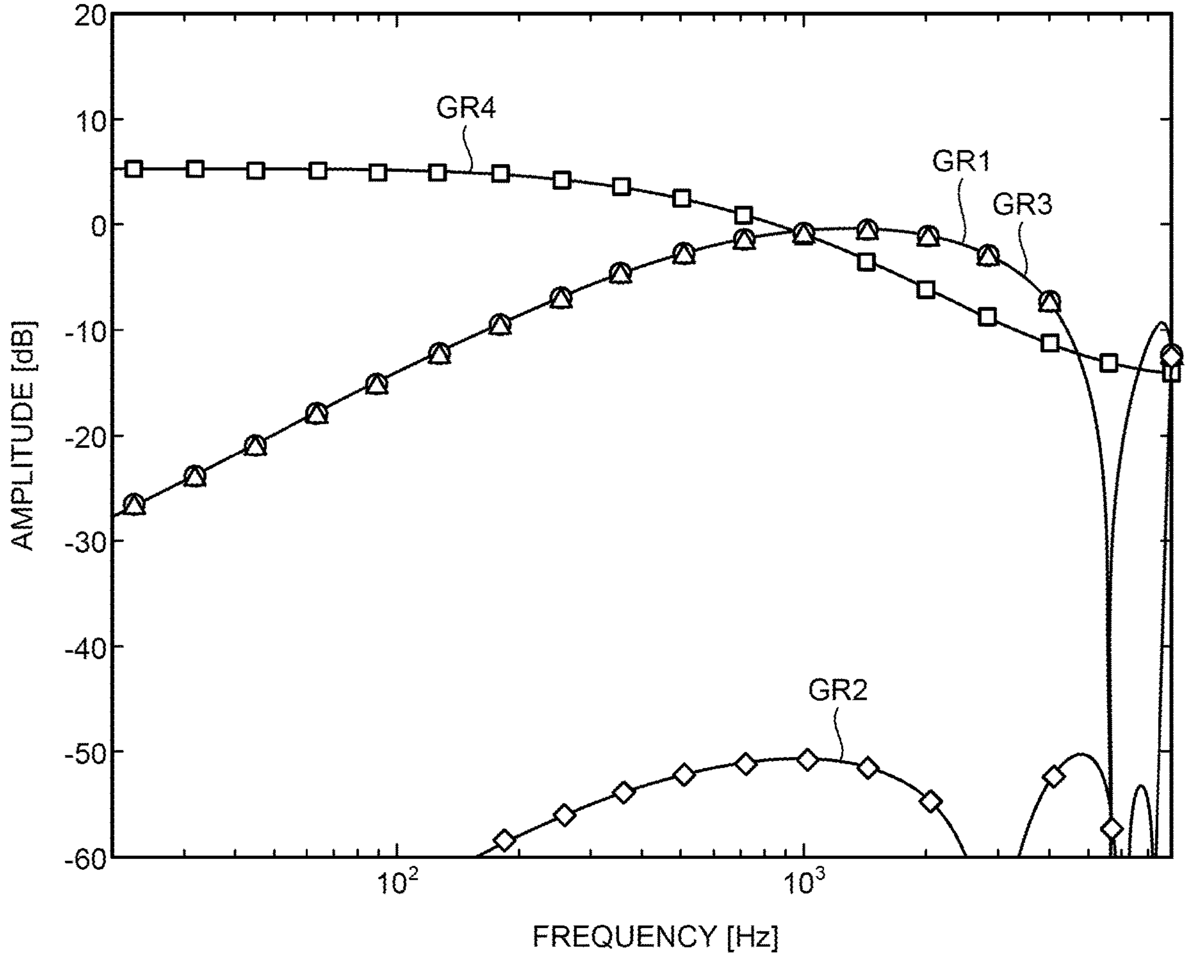
FIG. 6 is a graph illustrating an example of a frequency characteristic of an output signal output by a beam former according to the embodiment.

FIG. 6 is a graph illustrating a frequency characteristic of an output signal output by the beam former 230. In FIG. 6, a horizontal axis represents a frequency (Hz) and a vertical axis represents amplitude (dB).

A frequency characteristic GR1 is, for example, a frequency characteristic of the first output signal output by the beam former 230 in a case where the sound source arrival direction is fixed as indicated by the arrow AR1 illustrated in FIG. 5 and in a state where the microphone MC1 and the microphone MC2 do not fail. A frequency characteristic GR2 is, for example, a frequency characteristic of the second output signal in a case where the sound source arrival direction is fixed as indicated by the arrow AR1 illustrated in FIG. 5 and in a state where the microphone MC1 and the microphone MC2 do not fail.

A frequency characteristic GR3 is a frequency characteristic of the first output signal generated by correcting the frequency characteristic by the equalizer 236 with respect to a subtraction result after the adder 233 subtracts a signal having been obtained by adding the second delay amount to the first audio signal, from the first audio signal in a state where the microphone MC2 fails. A frequency characteristic GR4 is a frequency characteristic of the first output signal generated by correcting the frequency characteristic by the equalizer 236 with respect to a subtraction result after the adder 233 subtracts a signal having been obtained by adding the first delay amount to the second audio signal, from the first audio signal in a state where the microphone MC2 fails and the output signal of the microphone MC2 is 0. From FIG. 6, it can be seen that the frequency characteristic GR3 takes a value closer to the frequency characteristic GR1 than the frequency characteristic GR4.

Figure 7:
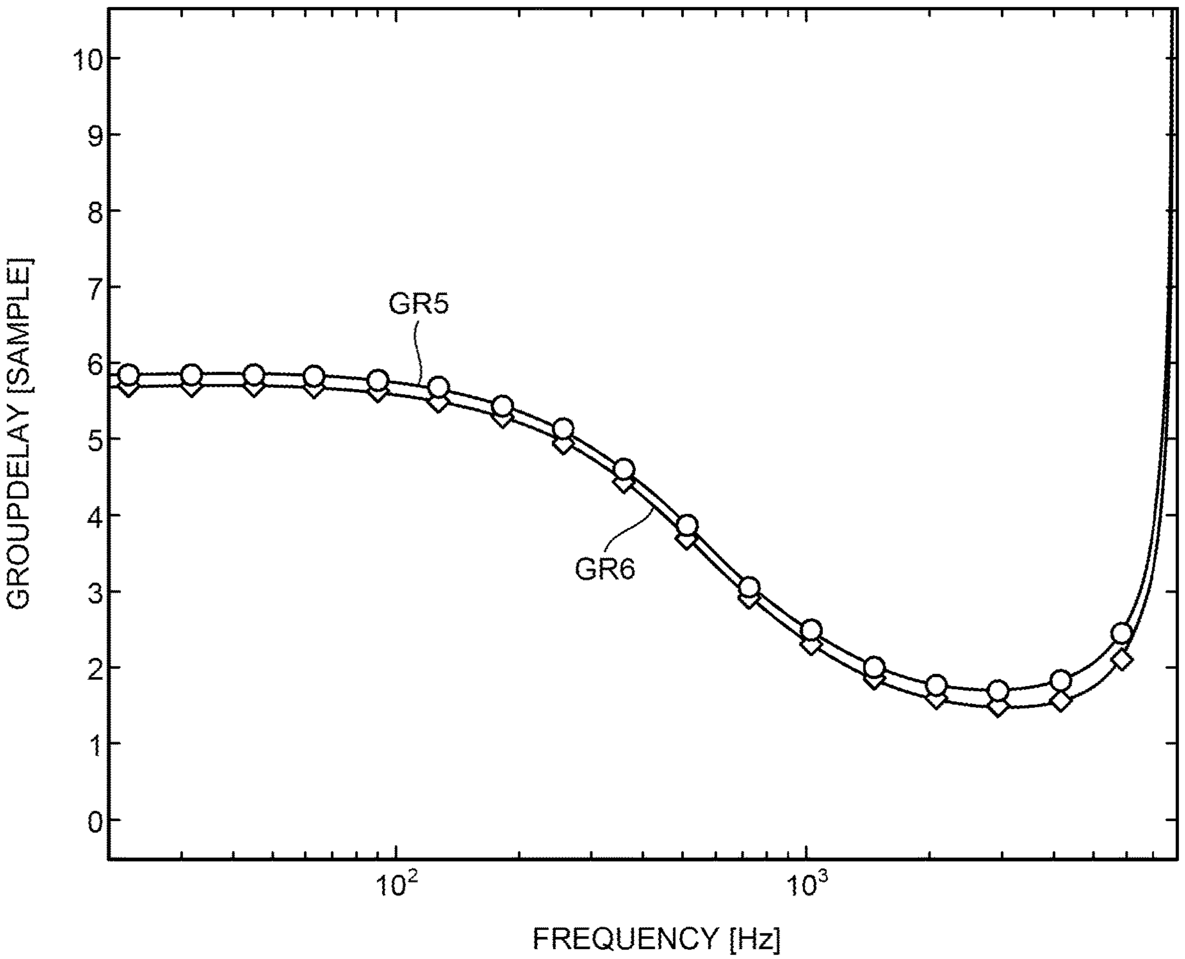
FIG. 7 is a graph illustrating an example of a group delay characteristic of an output signal output by the beam former according to the embodiment.

Next, a group delay characteristic of the first output signal output by the beam former 230 according to the present embodiment will be described with reference to FIG. 7. In FIG. 7, a horizontal axis represents a frequency (Hz) and a vertical axis represents a group delay (Sample). A group delay characteristic GR5 is a group delay characteristic of the first output signal in a case where the sound source arrival direction is fixed in the direction of the arrow AR1 illustrated in FIG. 5 and in a state where the microphone MC1 and the microphone MC2 do not fail. A group delay characteristic GR6 is a group delay characteristic of the first output signal output when the delay unit 2302 is selected in a state where the microphone MC2 fails.

The signal generation unit 238 performs different processing depending on the microphone failure state. However, as illustrated in FIG. 6, in a case where the sound source arrival direction is fixed in the direction of the arrow AR1 illustrated in FIG. 5, the frequency characteristic GR1 and the frequency characteristic GR3 overlap each other. Similarly, the group delay characteristic GR5 of the first output signal output by the equalizer 236 and the group delay characteristic GR6 take close values.

According to the present embodiment, the first output signal is generated on the basis of the first audio signal of the microphone MC1 for which no failure is detected. Therefore, even if the microphone MC2 is in a failure state, it is possible to secure the frequency amplitude characteristic and the group delay characteristic of the output signal similar to those in a state where no failure is detected.

Figure 8:
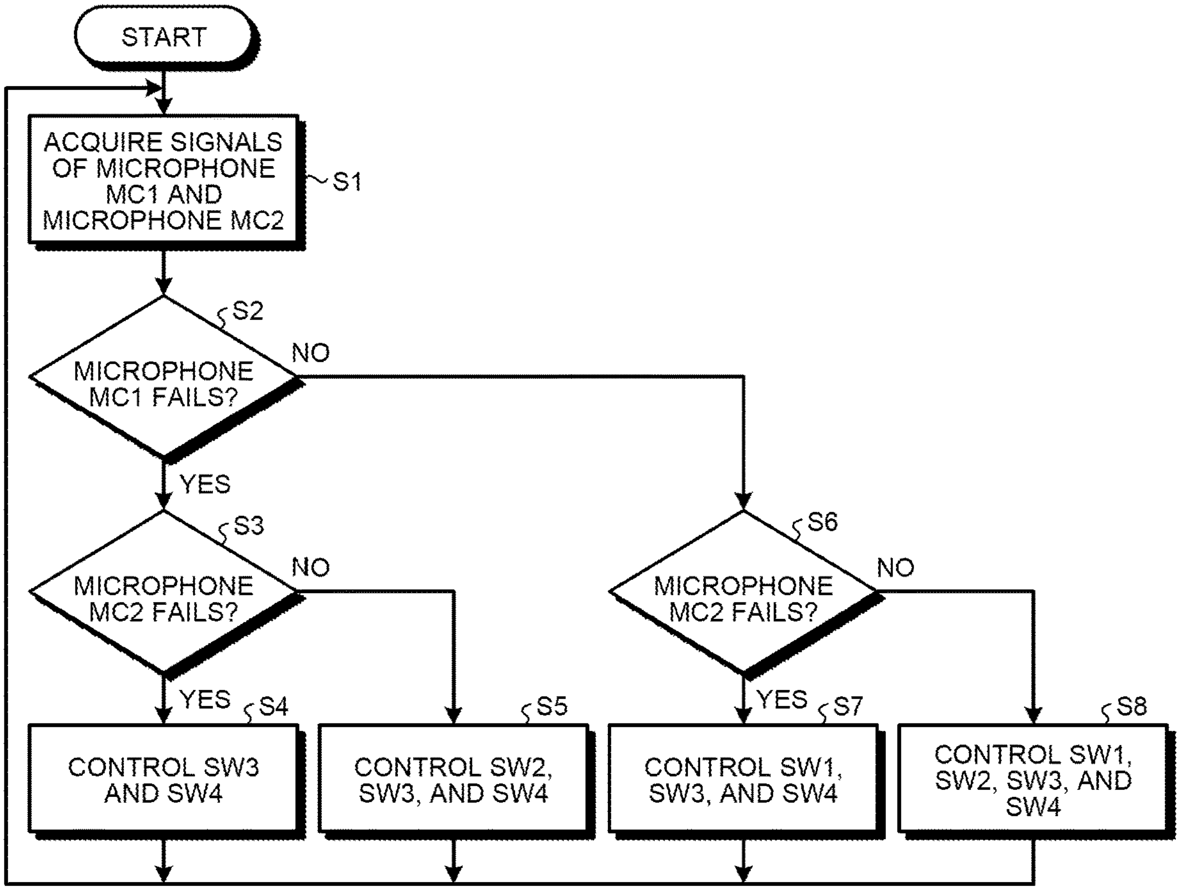
FIG. 8 is a flowchart illustrating an example of a procedure of control processing executed by the audio processing device according to the embodiment.
Figures 9, 10:
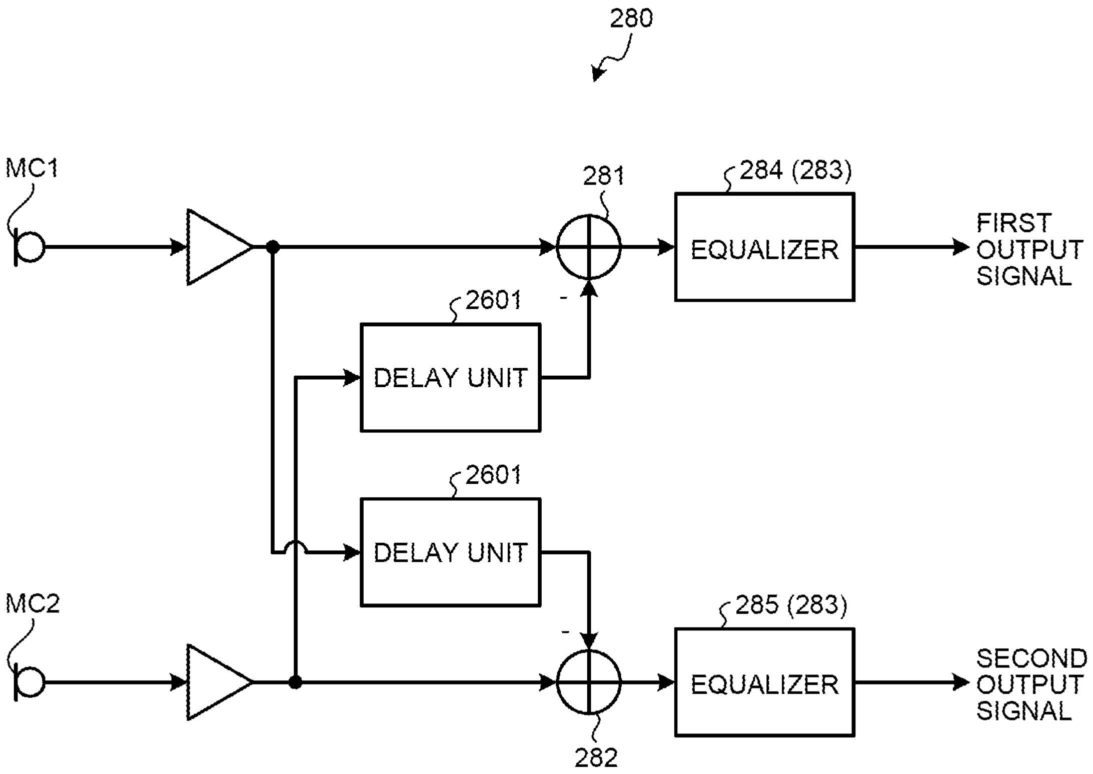
FIG. 9 is a table illustrating an example of an operation executed by the audio processing device according to the embodiment.
FIG. 10 is a diagram illustrating an example of a configuration of a beam former of a comparative example.

Next, an operation example of the audio processing system 5 according to the present embodiment will be described. FIG. 8 is a flowchart illustrating an example of the operation of the audio processing device 20 according to the present embodiment. FIG. 9 illustrates an example of content of an operation processed by the control unit 232 of the present embodiment.

The control unit 232 acquires failure detection information transmitted by the failure detection unit 231 (step S1).

Next, the control unit 232 confirms whether or not the acquired failure detection information includes information representing that the microphone MC1 fails (step S2). When the failure detection information includes the information representing that the microphone MC1 fails (step S2: Yes), the process proceeds to step S3. When the failure detection information includes information representing that the microphone MC1 does not fail (step S2: No), the process proceeds to step S6.

Next, the control unit 232 confirms whether the acquired failure detection information includes information representing that the microphone MC2 fails (step S3). When the failure detection information includes the information representing that the microphone MC2 fails (step S3: Yes), the process proceeds to step S4. When the failure detection information includes information representing that the microphone MC2 does not fail (step S2: No), the process proceeds to step S5.

Subsequently, the control unit 232 controls the switch SW3 and the switch SW4 (step S4). When the processing is completed, the process returns to step S1 again.

Subsequently, the control unit 232 controls the switch SW2, the switch SW3, and the switch SW4 (step S5). When the processing is completed, the process returns to step S1 again.

Next, the control unit 232 confirms whether the acquired failure detection information includes information representing that the microphone MC2 fails (step S6). When the failure detection information includes the information representing that the microphone MC2 fails (step S6: Yes), the process proceeds to step S7. When the failure detection information includes information representing that the microphone MC2 does not fail (step S6: No), the process proceeds to step S8.

Subsequently, the control unit 232 controls the switch SW1, the switch SW3, and the switch SW4 (step S7). When the processing is completed, the process returns to step S1 again.

Subsequently, the control unit 232 controls the switch SW1, the switch SW2, the switch SW3, and the switch SW4 (step S8). When the processing is completed, the process returns to step S1 again.

The contents of step S4, step S5, step S7, and step S8 processed by the control unit 232 will be specifically described. FIG. 9 is a table illustrating an operation of each switch corresponding to a processing step processed by the control unit 232.

In step S4, the control unit 232 controls the switch SW3 to be ON and controls the switch SW4 to be ON. Note that, in step S4, the control unit 232 may control the switch SW1 to select either the delay unit 2301 or the delay unit 2302. Note that, in step S4, the control unit 232 may control the switch SW2 to select either the delay unit 2303 or the delay unit 2304.

In step S5, the control unit 232 controls the switch SW2 to select the delay unit 2304, controls the switch SW3 to be ON, and controls the switch SW4 to be OFF. Note that, in step S5, the control unit 232 may control the switch SW1 to select either the delay unit 2301 or the delay unit 2302.

In step S7, the control unit 232 controls the switch SW1 to select the delay unit 2302, controls the switch SW3 to be OFF, and controls the switch SW4 to be ON. Note that, in step S7, the control unit 232 may control the switch SW2 to select either the delay unit 2303 or the delay unit 2304.

In step S8, the control unit 232 controls the switch SW1 to select the delay unit 2301, controls the switch SW2 to select the delay unit 2303, controls the switch SW3 to be OFF, and controls the switch SW4 to be OFF.

The processing content of each step described above is implemented by that, the control unit 232 switches the switch SW1, the switch SW2, the switch SW3, and the switch SW4. Alternatively, the audio processing device 20 may not include the physical switches SW1, SW2, SW3, and SW4. In this case, the functions may be implemented by the processor executing a computer program stored in the memory.

As described above, the audio processing system 5 according to one aspect of the present disclosure detects the presence or absence of failure of at least one of the first microphone that outputs the first audio signal and the second microphone that outputs the second audio signal, and transmits a detection result as failure detection information. The first output signal is generated on the basis of at least one of the first audio signal and the second audio signal. When the failure detection information includes information representing that the second microphone fails, the first output signal is generated on the basis of the first audio signal for which no failure is detected.

With the configuration above, even when some of the microphones fail, the audio processing system 5 can suppress the change in the output signal. Therefore, influence on the processing in the subsequent stage can be reduced, and thereby the audio processing system 5 can be stably operated.

Next, content processed by a beam former 280 as a comparative example will be described with reference to FIG. 10. FIG. 10 illustrates an example of a configuration of the beam former 280. The beam former 280 includes an adder 281, an adder 282, an equalizer 284, an equalizer 285, and a delay unit 2601. Hereinafter, the equalizer 284 and the equalizer 285 may be collectively referred to as an equalizer 283.

First, a procedure in which the beam former 280 processes an audio signal in a case where the microphone MC2 fails and the output is zero will be described. The beam former 280 generates the first output signal on the basis of the first audio signal output by the microphone MC1. More specifically, the equalizer 284 performs correction of a frequency characteristic on the first audio signal output by the microphone MC1, and generates the first output signal.

In addition, the beam former 280 generates the second output signal on the basis of the first audio signal output by the microphone MC1. More specifically, the equalizer 285 performs correction of a frequency characteristic on a signal obtained by adding a delay amount to the first audio signal output by the microphone MC1 by the delay unit 2601 and inverting a sign of the signal, and generates the second output signal.

Next, a procedure in which the beam former 280 processes the audio signal in a case where neither the microphone MC1 nor the microphone MC2 fails will be described. The beam former 280 generates the first output signal on the basis of the first audio signal output by the microphone MC1 and the second audio signal output by the microphone MC2.

More specifically, the adder 233 subtracts a signal having been obtained by adding a delay amount to the second audio signal output by the microphone MC2 by the delay unit 2601, from the first audio signal output by the microphone MC1. The equalizer 284 performs correction of a frequency characteristic on a subtraction result to generate the first output signal. The delay amount added by the delay unit 2601 is, for example, the same value as the delay amount added by the delay unit 2301.

In addition, the beam former 280 generates the first output signal on the basis of the first audio signal output by the microphone MC1 and the second audio signal output by the microphone MC2. More specifically, first, the adder 234 subtracts a signal having been obtained by adding a delay amount to the first audio signal output by the microphone MC1 by the delay unit 2601, from the second audio signal output by the microphone MC2. The equalizer 285 performs correction of a frequency characteristic on a subtraction result to generate the second output signal.

Figure 11:
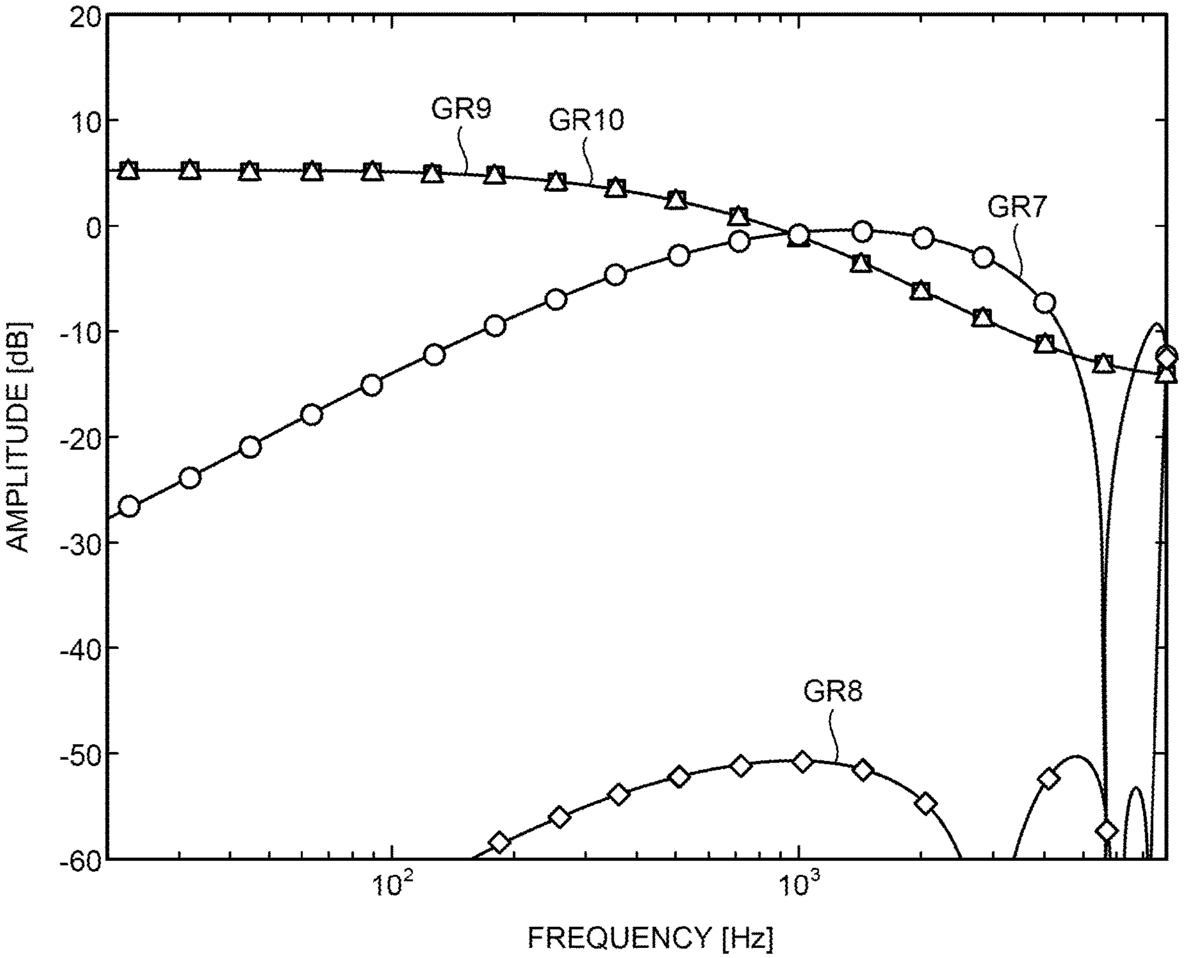
FIG. 11 is a graph illustrating an example of a frequency characteristic of an output signal output by a beam former of a comparative example.

Next, the frequency characteristic of the output signal generated by the beam former 280 of the comparative example will be described with reference to FIG. 11. In FIG. 11, a horizontal axis represents a frequency (Hz) and a vertical axis represents amplitude (dB). Here, the arrangement of the microphone MC1 and the microphone MC2 illustrated in FIG. 10 is the same as those in FIG. 5.

A frequency characteristic GR7 is a frequency characteristic of the first output signal output by the beam former 280 in a case where the sound source arrival direction is fixed as indicated by the arrow AR1 illustrated in FIG. 5 and in a state where the microphone MC1 and the microphone MC2 do not fail. A frequency characteristic GR8 is a frequency characteristic of the second output signal output by the beam former 280 in a case where the sound source arrival direction is fixed as indicated by the arrow AR1 illustrated in FIG. 5 and in a state where the microphone MC1 and the microphone MC2 do not fail.

A frequency characteristic GR9 is a frequency characteristic of the first output signal output by the beam former 280 in a case where the sound source arrival direction is fixed as indicated by the arrow AR1 illustrated in FIG. 5 and in a state where the microphone MC2 fails. A frequency characteristic GR10 is a frequency characteristic of the second output signal output by the beam former 280 in a case where the sound source arrival direction is fixed as indicated by the arrow AR1 illustrated in FIG. 5 and in a state where the microphone MC2 fails.

Comparing a state where the microphone MC1 and the microphone MC2 do not fail with a state where the microphone MC2 fails, the output of the microphone MC2 is zero in the latter case. For this reason, the processing of subtracting the signal having been obtained by adding the delay amount to the second audio signal output by the microphone MC2 from the output signal of the microphone MC1 is not performed. Therefore, the frequency characteristic GR7 and the frequency characteristic GR9 have different characteristics.

Moreover, in a case where the microphone MC2 fails, the second audio signal output by the microphone MC2 is not input to the equalizer 285, and only the signal of the microphone MC1 to which the first delay amount has been added is input. For this reason, the output of the equalizer 285 is obtained by applying the EQ characteristic to an omnidirectional signal. Therefore, the frequency characteristic GR8 and the frequency characteristic GR10 also have different characteristics.

As a result, the signal output by the beam former 280 of the comparative example exhibits different characteristics in a case where none of the microphones fails and a case where some microphones fail. Therefore, in a case where some microphones fail, if the utterance position specifying unit 250 of the present embodiment specifies the utterance position on the basis of the output signal of the beam former 280 of the comparative example, there is a possibility that an incorrect utterance position is specified. This is because, although the frequency balance of each output signal is taken into consideration in the utterance position detection, the frequency amplitude characteristics of the output signal are different in a case where none of the microphones fails and a case where some microphones fail.

Furthermore, in a case where the utterance position specifying unit 250 specifies an incorrect utterance position and the cross talk canceller 260 of the present embodiment executes the crosstalk cancellation processing on the basis of the utterance position, there is a possibility that the crosstalk cancellation cannot be appropriately executed. That is, in a case where some microphones are in a failure state, if the output signal processed by the beam former 280 of the comparative example is used, there is a possibility that the audio processing device 20 cannot correctly process the output signal.

Figure 12:
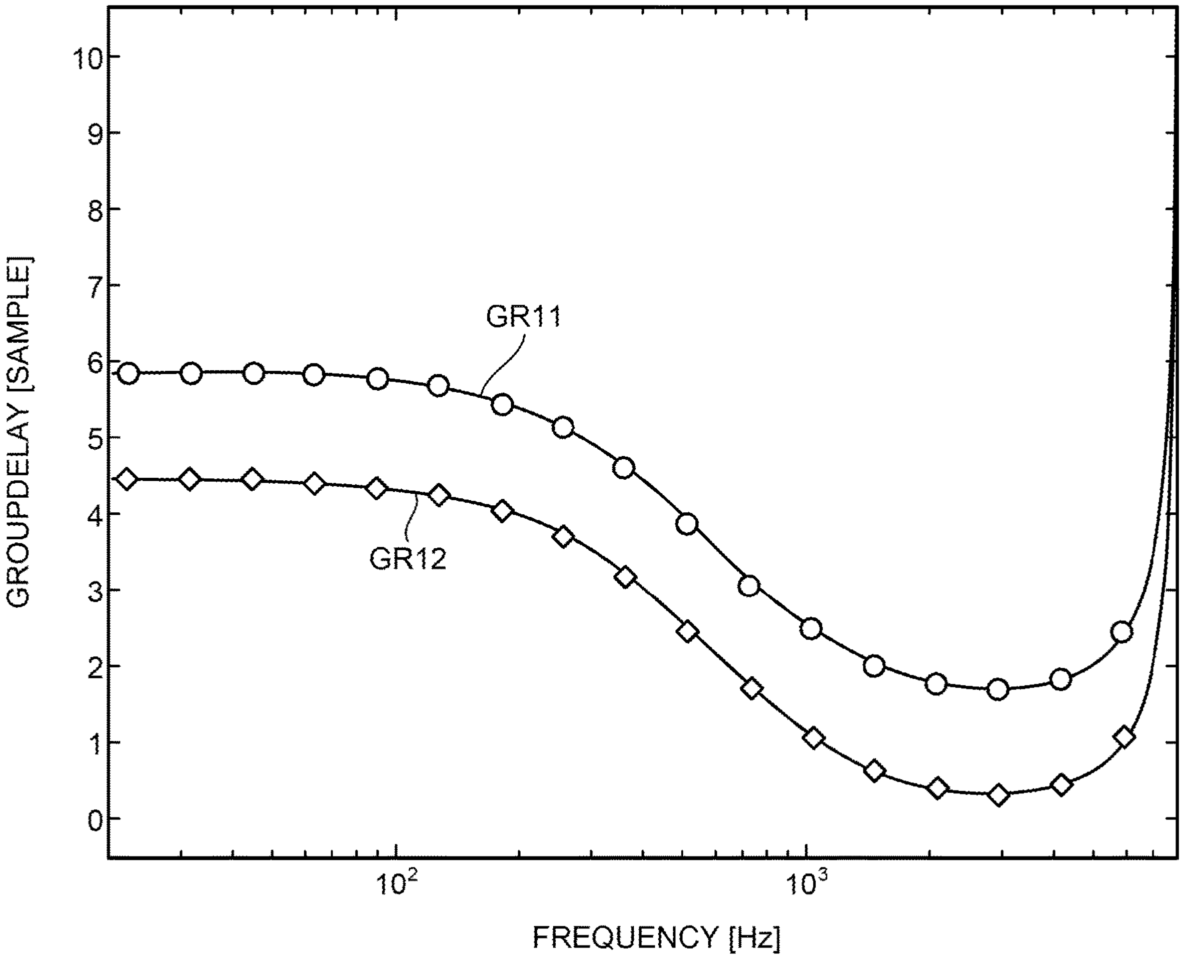
FIG. 12 is a graph illustrating an example of a group delay characteristic of an output signal output by a beam former of a comparative example.

Next, a group delay characteristic of the first output signal output by the beam former 280 of the comparative example will be described with reference to FIG. 12. In FIG. 12, a horizontal axis represents a frequency (Hz) and a vertical axis represents a group delay (Sample). A group delay characteristic GR11 is a group delay characteristic of the first output signal output by the beam former 280 in a case where the sound source arrival direction is fixed in the direction of the arrow AR1 illustrated in FIG. 5 and in a state where the microphone MC1 and the microphone MC2 do not fail. A group delay characteristic GR12 is a group delay characteristic of the first output signal output by the beam former 280 in a case where the sound source arrival direction is fixed in the direction of the arrow AR1 illustrated in FIG. 5 and in a state where the microphone MC2 fails.

Even in a case where the microphone fails, the beam former 280 performs the same processing as that in a case where the microphone does not fail. Therefore, as illustrated in FIG. 11, the frequency characteristic GR7 and the frequency characteristic GR9 do not overlap. In addition, the group delay characteristic GR11 and the group delay characteristic GR12 become different group delay characteristics.

The program executed by the audio processing system 5 of the present embodiment is provided by being recorded in a computer-readable recording medium such as a CD-ROM, a flexible disk (FD), a CD-R, or a digital versatile disk (DVD) as a file in an installable format or an executable format.

In addition, the program executed by the audio processing system 5 of the present embodiment may be stored on a computer connected to a network such as the Internet and provided by being downloaded via the network. In addition, the program executed by the audio processing system 5 of the present embodiment may be provided or distributed via a network such as the Internet. In addition, the program executed by the audio processing system 5 of the present embodiment may be provided by being incorporated in the ROM 3002 or the like in advance.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An audio processing system comprising:
- a first microphone configured to collect first audio and output a first audio signal corresponding to the first audio;
- a second microphone configured to collect second audio and output a second audio signal corresponding to the second audio;
- a memory in which a computer program is stored; and
- a hardware processor connected to the memory and configured to perform processing by executing the computer program, the processing including
  - detecting presence or absence of failure of at least one of the first microphone and the second microphone and transmitting a detection result as failure detection information,
  - generating a first output signal on the basis of at least one of the first audio signal and the second audio signal,
  - generating the first output signal in a first mode when the failure detection information includes information representing that the second microphone fails, the first mode being a mode in which the hardware processor generates the first output signal on the basis of the first audio signal output by the first microphone for which no failure is detected, and
  - generating the first output signal in a second mode when the failure detection information includes information representing that neither the first microphone nor the second microphone fails, the second mode being a mode in which the hardware processor generates the first output signal on the basis of the first audio signal output by the first microphone for which no failure is detected and the second audio signal output by the second microphone for which no failure is detected,
- wherein generating the first output signal includes:
  - generating a subtraction signal by delaying the first audio signal by a second delay amount in the first mode,
  - generating the subtraction signal by delaying the second audio signal by a first delay amount in the second mode, the second delay amount is twice the first delay amount, and
  - generating the first output signal by subtracting the subtraction signal from the first audio signal.

2. The audio processing system according to claim 1, wherein the processing performed by the hardware processor includes generating a second output signal on the basis of at least one of the first audio signal and the second audio signal, outputting the first output signal as a signal corresponding to the first microphone, and outputting the second output signal as a signal corresponding to the second microphone, and outputting no second output signal when the failure detection information includes information representing that the second microphone fails.

3. The audio processing system according to claim 1, wherein the processing performed by the hardware processor includes outputting the failure detection information to a notification device when the failure detection information includes information representing that at least one of the first microphone and the second microphone fails, and the notification device notifies that at least one of the first microphone and the second microphone fails.

4. An audio processing device comprising:

a memory in which a computer program is stored; and a hardware processor connected to the memory and configured to perform processing by executing the computer program, the processing including detecting presence or absence of failure of at least one of a first microphone and a second microphone and transmitting a detection result as failure detection information, the first microphone collecting a first audio and outputting a first audio signal corresponding to the first audio, the second microphone collecting a second audio and outputting a second audio signal corresponding to the second audio, generating a first output signal on the basis of at least one of the first audio signal and the second audio signal, generating the first output signal in a first mode when the failure detection information includes information representing that the second microphone fails, the first mode being a mode in which the hardware processor generates the first output signal on the basis of the first audio signal output by the first microphone for which no failure is detected, generating a second output signal on the basis of at least one of the first audio signal and the second audio signal, outputting the first output signal as a signal corresponding to the first microphone, and outputting the second output signal as a signal corresponding to the second microphone, and outputting no second output signal when the failure detection information includes information representing that the second microphone fails.

5. An audio processing method executed by an audio processing device, the method comprising:

detecting presence or absence of failure of at least one of a first microphone and a second microphone and transmitting a detection result as failure detection information, the first microphone collecting a first audio and outputting a first audio signal corresponding to the first audio, the second microphone collecting a second audio and outputting a second audio signal corresponding to the second audio, generating a first output signal on the basis of at least one of the first audio signal and the second audio signal, generating the first output signal in a first mode when the failure detection information includes information representing that the second microphone fails, the first mode being a mode in which the audio processing device generates the first output signal on the basis of the first audio signal output by the first microphone for which no failure is detected, and generating the first output signal in a second mode when the failure detection information includes information representing that neither the first microphone nor the second microphone fails, the second mode being a mode in which the audio processing device generates the first output signal on the basis of the first audio signal output by the first microphone for which no failure is detected and the second audio signal output by the second microphone for which no failure is detected, wherein generating the first output signal includes:

generating a subtraction signal by delaying the first audio signal by a second delay amount in the first mode, generating the subtraction signal by delaying the second audio signal by a first delay amount in the second mode, the second delay amount is twice the first delay amount, and generating the first output signal by subtracting the subtraction signal from the first audio signal.

* * * * *